(12) United States Patent
Nelson et al.

(10) Patent No.: US 9,140,166 B1
(45) Date of Patent: Sep. 22, 2015

(54) REDUCTANT DOSING SYSTEM

(71) Applicant: Caterpillar Inc., Peoria, IL (US)

(72) Inventors: Bryan Edward Nelson, Chillicothe, IL (US); Kevin L. Dea, Morton, IL (US); Brian Cole, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/245,197

(22) Filed: Apr. 4, 2014

(51) Int. Cl.
*F01N 3/00* (2006.01)
*F01N 3/20* (2006.01)

(52) U.S. Cl.
CPC ............ *F01N 3/208* (2013.01); *F01N 3/2006* (2013.01); *F01N 2610/02* (2013.01); *F01N 2610/1433* (2013.01)

(58) Field of Classification Search
CPC ............... F01N 3/208; F01N 3/2066; F01N 2610/1433; F01N 2610/02
USPC .............. 60/274, 286, 289, 290, 301, 303
See application file for complete search history.

(56) References Cited

U.S. PATENT DOCUMENTS

| | | | |
|---|---|---|---|
| 3,941,509 A | 3/1976 | Gillilan et al. | |
| 4,052,852 A | 10/1977 | Hart | |
| 5,605,042 A * | 2/1997 | Stutzenberger | 60/286 |
| 5,884,475 A * | 3/1999 | Hofmann et al. | 60/274 |
| 6,050,088 A * | 4/2000 | Brenner | 60/303 |
| 6,273,120 B1 | 8/2001 | Hofmann et al. | |
| 7,594,393 B2 * | 9/2009 | Offenhuber et al. | 60/286 |
| 7,818,961 B2 | 10/2010 | Leonard | |
| 8,015,801 B2 | 9/2011 | Oberski et al. | |
| 8,046,988 B2 * | 11/2011 | Heebink et al. | 60/297 |
| 8,083,105 B2 | 12/2011 | Reichert et al. | |
| 8,256,209 B2 | 9/2012 | Rodriguez-Amaya et al. | |
| 8,359,833 B2 | 1/2013 | Nalla et al. | |
| 8,359,834 B2 | 1/2013 | Gaudin et al. | |
| 8,393,142 B2 | 3/2013 | Mupparapu et al. | |
| 8,459,012 B2 | 6/2013 | Sun et al. | |
| 8,549,842 B2 | 10/2013 | Park | |
| 8,635,854 B2 | 1/2014 | Shovels et al. | |
| 2003/0033799 A1 | 2/2003 | Scheying | |
| 2005/0252201 A1 * | 11/2005 | Lecea et al. | 60/286 |
| 2013/0000743 A1 | 1/2013 | Crary | |
| 2013/0055701 A1 | 3/2013 | Yan et al. | |

FOREIGN PATENT DOCUMENTS

| | | |
|---|---|---|
| CN | 101818675 A | 9/2010 |
| CN | 102451617 | 5/2012 |

(Continued)

*Primary Examiner* — Thomas Denion
*Assistant Examiner* — Diem Tran
(74) *Attorney, Agent, or Firm* — Miller, Matthias & Hull LLP

(57) ABSTRACT

A reductant dosing system for an engine is disclosed. The disclosed reductant dosing system includes a reservoir of reductant fluid that is connected to an inlet of a reductant pump. The pump has an outlet that is fluidly connected to the reservoir, an inlet of a pressure regulator and an inlet of an injector. The pressure regulator includes a reductant pressure control valve that fluidly connects the outlet of the reductant pump to the reservoir when the reductant pressure control valve is in an open position. A compressed gas source is fluidly connected to an air supply control valve that fluidly connects the compressed gas source to the reservoir when the air supply control valve is in an open position. The air supply control valve also has a closed position and is shifted between the open and closed positions by a controller.

19 Claims, 2 Drawing Sheets

(56) References Cited

FOREIGN PATENT DOCUMENTS

| CN | 202789025 U | 3/2013 |
| CN | 103216294 | 7/2013 |
| DE | 102009032489 A1 | 1/2011 |
| EP | 1222371 B1 | 12/2004 |
| EP | 1612381 A1 | 1/2006 |
| JP | 2010127078 | 6/2010 |
| RU | 2422667 | 6/2011 |

* cited by examiner

REDUCTANT DOSING SYSTEM

BACKGROUND

1. Technical Field

This disclosure is directed to exhaust systems for internal combustion engines that include reductant dosing systems. More specifically, the disclosed reductant dosing systems are less prone to pressure pulsations and can operate at high altitudes and at high temperatures without significant vaporization or boiling of the reductant fluid.

2. Description of the Related Art

Internal combustion engines include diesel, gasoline, gaseous fuel-powered and other engines known in the art. These engines produce a complex mixture of emissions. These emissions include gaseous compounds such as oxides of nitrogen, NO and $NO_2$, or collectively, NOx. In atmospheric chemistry, the term NOx means the total concentration of NO and $NO_2$. Due to increased environmental awareness, the amount of NOx emitted to the atmosphere by an engine is regulated depending on the type, size and/or class of the engine.

In order to comply with the regulation of NOx emissions, some engine manufacturers have implemented a strategy called selective catalytic reduction (SCR). SCR is an exhaust treatment process where a reductant, most commonly urea $((NH_2)_2CO)$ or a water/urea solution, is selectively injected into the exhaust gas stream of an engine and adsorbed onto a downstream substrate. The adsorbed urea decomposes into ammonia ($NH_3$), which reacts with NOx in the exhaust gas to form water ($H_2O$) and diatomic nitrogen ($N_2$).

Reductant dosing systems may be used to introduce the reductant, e.g., urea, into the exhaust stream. In one example, an aqueous urea solution may be stored in a tank. The aqueous urea solution or reductant fluid may be referred to as DEF (diesel exhaust fluid), and may consist of about 32.5 wt % urea and about 67.5 wt % water.

As the power system or engine operates and produces exhaust, DEF is pumped from the tank and intermittently sprayed into the exhaust stream via an injector. Some reductant dosing systems control the DEF pressure by varying the pump speed while simultaneously monitoring the DEF pressure. However, such a reductant dosing system can produce pressure pulsations, which cannot be accurately controlled by modifying the pump speed. Further, the pressure drop in the pump suction line in combination with operation at high altitudes (low ambient pressure) and/or high temperatures can result in significant vaporization or boiling of the DEF. Vaporization or boiling of the DEF may result in a mixture of vapor and fluid entering the pump, which prevents accurate dosing of the DEF into the exhaust stream.

CN 101818675 avoids relying upon modifying the pump speed by eliminating the pump altogether and pressurizing the DEF tank. While, such a system without a pump is applicable to passenger vehicles with diesel engines, reliance upon a pressurized DEF tank alone, without a pump, may not be suitable for larger diesel power systems, such as those for trucks, generators, construction equipment, mining equipment, etc.

SUMMARY OF THE DISCLOSURE

In one aspect, a reductant dosing system for an engine is disclosed. The disclosed reductant dosing system may include a reservoir that accommodates a reductant fluid. The reservoir may be fluidly connected to an inlet of a reductant pump. The reductant pump may have an outlet that is fluidly connected to the reservoir, as well as to an inlet of a pressure regulator and to an inlet of an injector. The pressure regulator may include a reductant pressure control valve that fluidly connects the outlet of the reductant pump to the reservoir when the reductant pressure control valve is in an open position. The system may further include a compressed gas source that is fluidly connected to an air supply control valve that fluidly connects the compressed gas source to the reservoir when the air supply control valve is in an open position. The air supply control valve also has a closed position. The air supply control valve may be linked to a controller for shifting the air supply control valve between the open and closed positions.

In another aspect, a power source is disclosed. The disclosed power source includes an engine that is connected to an exhaust system. The exhaust passes through a selective catalytic reduction (SCR) module. The exhaust may also be fluidly connected to a reductant dosing system disposed upstream of the SCR module. The reductant dosing system may include a reservoir that accommodates reductant fluid, a compressed gas source and a reductant pump. The compressed gas source and reductant pump may be coupled to and driven by the engine. The reservoir may be fluidly connected to an inlet of the reductant pump. The reductant pump may have an outlet that may be fluidly connected to the reservoir, as well as to an inlet of a pressure regulator and to an inlet of an injector. The pressure regulator may include a reductant pressure control valve that fluidly connects the outlet of the reductant pump to the reservoir when the reductant pressure control valve is in an open position. The compressed gas source may be fluidly connected to an air supply control valve. The air supply control valve may fluidly connect the compressed gas source to the reservoir when the air supply control valve is in an open position. The air supply control valve may also have a closed position and the air supply control valve may be linked to a controller for shifting the air supply control valve between the open and closed positions.

In yet another aspect, a method for injecting reductant into an exhaust stream of an engine is disclosed. The disclosed method may include providing a reservoir of reductant fluid and pressurizing the reservoir with a compressed gas source that is fluidly connected to the reservoir through an air supply control valve. The method may further include ordering a first dosing event. The method may then include pumping reductant fluid from the reservoir to an injector with a reductant pump and regulating a pressure of the reductant fluid that is pumped from the reservoir to the injector. If the pressure of the reductant fluid pumped from the reservoir to the injector is below a first predetermined value, the method further includes opening the air supply control valve. And, if the pressure of the reductant fluid pumped from the reservoir to the injector is above a predetermined value, the method may further include closing the air supply control valve.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
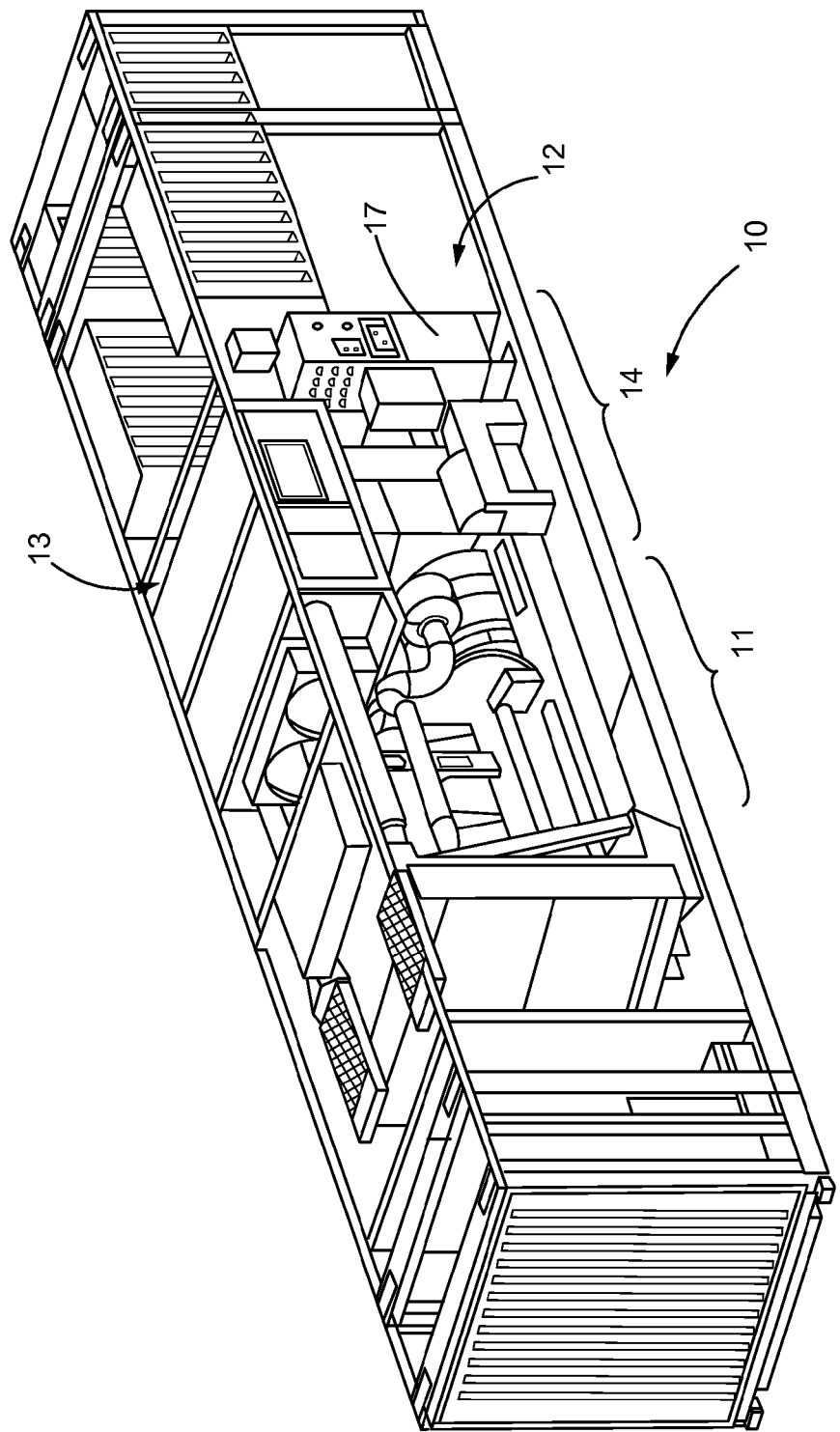
FIG. 1 is a perspective view of an exemplary disclosed power system.
Figure 2:
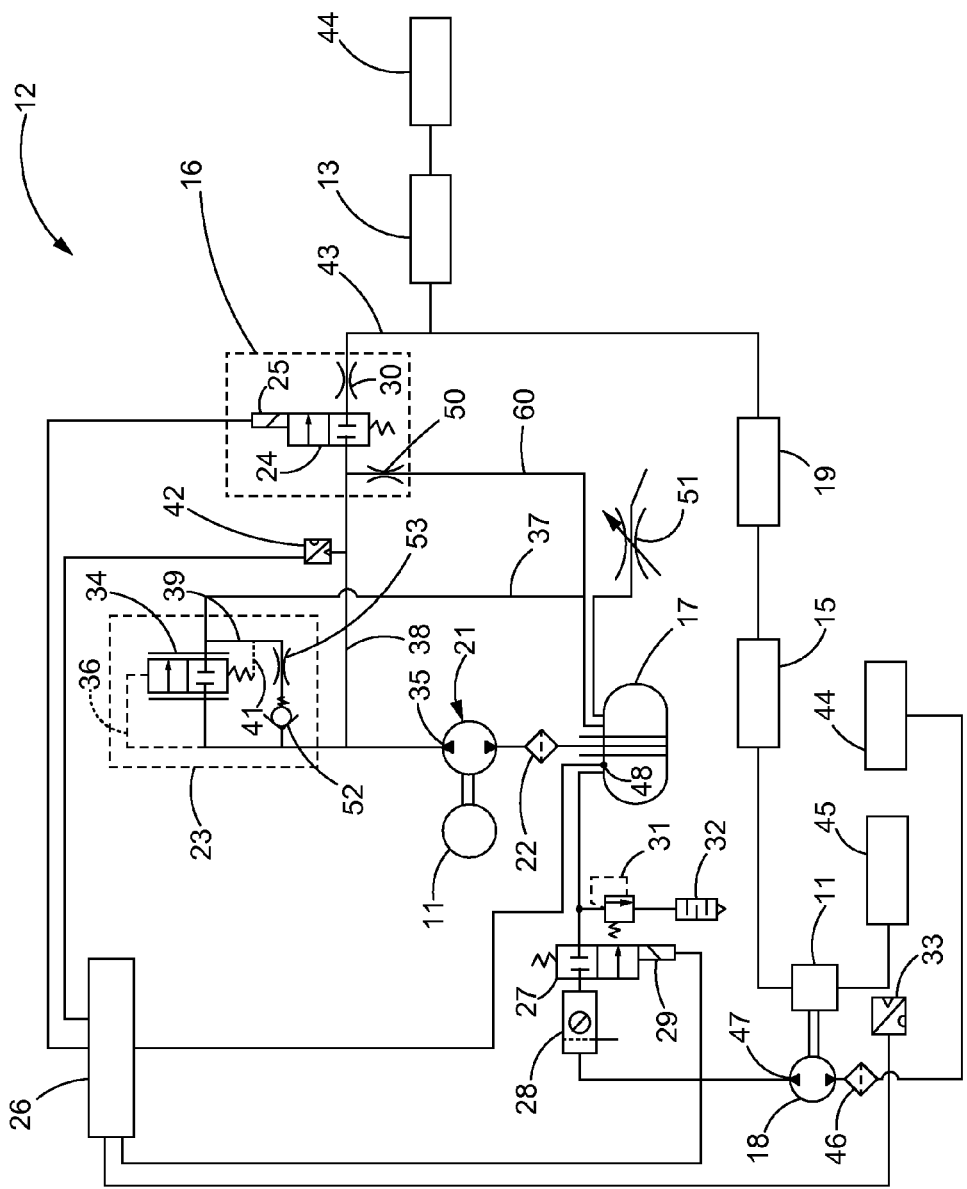
FIG. 2 is a schematic illustration of the power system of FIG. 1, particularly illustrating the disclosed reductant dosing system.

FIGS. 1 and 2 illustrate an exemplary power system 10 having an engine 11 and a reductant dosing system 12. The engine 11 may be an internal combustion engine operable to combust fuel and produce a mechanical power outlet and a flow of exhaust. The exhaust from the engine 11 may be directed through an aftertreatment system 13 before being released to the atmosphere. In one example, the aftertreatment system 13 may include the use of a reduction catalyst configured to reduce a constituent of the exhaust in the presence of a reductant to an acceptable level before the exhaust is discharged to the atmosphere. Such aftertreatement systems like that shown at 13 in FIG. 1 are often referred to as selective catalytic reduction (SCR) systems or modules. The reductant dosing system 12 may be configured to supply the correct amount of reductant utilized for the reduction process that occurs within the SCR module or aftertreatment system 13.

It is contemplated that the engine 11 may be associated with a generator 14 that converts mechanical power of the engine 11 into electrical power. In one embodiment, the engine 11 and generator 14 may together form a stationary generator set. In another embodiment, the engine 11 and generator 14 may together embody the prime mover of a mobile machine, for example a locomotive. In yet another embodiment, the engine 11 may be used without a generator 14, for example in vehicular applications, pumping applications, and marine applications. If the engine 11 is a diesel engine, the reductant fluid may be an aqueous urea solution (e.g., 32.5 wt % urea, 67.5 wt % water), or DEF. In some applications, the urea content may reach 40 wt %.

As shown in FIG. 2, the reductant dosing system 12 may be configured to spray or otherwise advance reductant fluid into the exhaust 15 upstream of the aftertreatment system 13 to produce a reducing chemical reaction. At temperatures higher than about 250° C., the urea solution may decompose into ammonia ($NH_3$) that is used to convert $NO_x$ (NO and $NO_2$) in the exhaust 15 of the engine 11 to diatomic nitrogen ($N_2$) and water ($H_2O$). The reductant dosing system 12 may include a reductant injector 16 disposed upstream or at the aftertreatment system 13, a reductant reservoir 17 and a compressed gas source 18 associated with the engine 11 and configured to supply pressurized air to the reductant reservoir 17. In some embodiments, a diesel particulate filter (DPF) 19 may be disposed upstream of both the reductant injector 16 and the aftertreatment system 13. The reductant injector 16 may include a normally closed directional control valve 24 (hereinafter "injector control valve') that may be opened when a signal is received at the solenoid 25 from the controller 26. A restriction or an orifice 30 may be disposed between the injector control valve 24 and the aftertreatment module or the aftertreatment system 13.

The compressed gas source 18 may be an air compressor as indicated in FIG. 2, or the compressed gas source may be provided by a turbocharger in the form of compressed air or compressed exhaust. Also, the compressed gas source 18 may be a compressed gas container, such as a $CO_2$ or $N_2$ bottle or reservoir or any other convenient source of compressed gas, as will be apparent to those skilled in the art.

An air supply control valve 27 may be disposed downstream of the compressed gas source 18. The air supply control valve 27 may be a normally closed, two way, two position directional control valve having a solenoid 29 that is linked to the controller 26. In response to a signal received from the controller 26, the air supply control valve 27 provides communication between the compressed gas source 18 and the reductant reservoir 17. A reservoir safety relief valve 31 may be disposed between the air supply control valve 27 and the reductant reservoir 17. The safety relief valve 31 may be in fluid communication with a muffler or air exhaust silencer 32. A combination air filter and pressure regulator 28 may be disposed in-line between the compressed gas source 18 and the air supply control valve 27. Of course, separate components may be used for filtering and pressure regulation, as will be apparent to those skilled in the art.

Instead of the two way, two position air supply control valve 27 shown in FIG. 2, a three way, two position valve (not shown) could be used that vents the reductant reservoir 17 to the atmosphere when the valve is in the non-energized position. In the energized position, communication is provided between the compressed gas source 18 and the reductant reservoir 17 while communication between the atmosphere and the reductant reservoir 17 is blocked. Use of such a three way, two position air supply control valve may eliminate the need for the safety relief valve 31, as will be apparent to those skilled in the art.

An ambient air pressure sensor 33 may be linked to the controller 26 for purposes of monitoring the ambient air pressure, especially at higher altitudes. The compressed gas source 18 and the reductant pump 21 may both be driven or powered by the engine 11 as shown in FIG. 2.

The pressure regulator 23 may also include a normally closed directional reductant control valve 34 that provides variable spool positions thereby permitting variable flow through the reductant control valve 34. When a pressure at a pump outlet 35 of the reductant pump 21 exceeds a threshold value, pressure in the pilot line 36 shifts the reductant control valve 34 from the closed position shown in FIG. 2 to an open position (not shown) thereby providing communication between the pump outlet 35 and the reductant return line 37. As shown in FIG. 2, the reductant return line 37 is in communication with the reductant reservoir 17. In contrast, when the fluid pressure at the pump outlet 35 is insufficient to shift the reductant control valve 34 to the open position, the reductant control valve 34 remains closed and the pump outlet 35 is in communication with the line 38 that leads to reductant injector 16 or, more specifically, the injector control valve 24.

Returning to the reductant control valve 34, when the reductant control valve 34 is open, the pump outlet 35 is in communication with the backflow line 39 in addition to the reductant return line 37. The backflow line 39 is in communication with the pilot line 41. If pressure in the backflow line 39 and therefore the pilot line 41 reaches a threshold value, the reductant control valve 34 will shift back to the closed position shown in FIG. 2. This happens when there is sufficient pressure in the reductant reservoir 17 so that the fluid pressure in the reductant return line 37 and backflow line 39 are sufficient to close the reductant control valve 34. In contrast, when pressure in the lines 37, 39 are insufficient to close the reductant control valve 34, the pressure at the pump outlet 35 is communicated to the pilot line 36 to shift the reductant control valve 34 to an open position.

With the reductant control valve 34 in the closed position as shown in FIG. 2, the pressure in the line 38 should be sufficient for an injection event. Reductant fluid is communicated from the pump outlet 35, through the line 38, past the reductant fluid pressure sensor 42 and to the injector control valve 24 of the reductant injector 16. If the pressure in the line 38 is sufficient for an injection event, as measured by the reductant fluid pressure sensor 42 and communicated to the controller 26, the controller 26 sends a signal to the solenoid 25 of the injector control valve 24 to open the injector control valve 24, thereby providing communication between the line 38 and the restriction or orifice 30. Fluid is sprayed through the orifice 30 and into the line 43 which leads to the aftertreatment system 13, which, in turn, is in communication with the atmosphere 44. When the injector control valve 24 is closed, fluid in the line 38 is routed through the orifice 50 and the return line 60 back to the reductant reservoir 17.

Referring to the bottom of FIG. 2, in operation, the engine 11 is coupled to an air intake 45, which is in communication with the atmosphere 44. Air from the air intake 45 is combined with fuel in the engine 11 and combusted to produce an exhaust 15. The exhaust 15 may pass through an aftertreatment device, such as a DPF 19, before the exhaust stream makes its way to the aftertreatment system 13 and before it is released to the atmosphere 44.

Air from the atmosphere 44 may also be drawn through an air filter 46 and into the compressed gas source 18. The compressed gas source 18 may be driven by the engine 11. The compressed gas source 18 includes an compressor outlet 47 that may be in direct communication with an air supply control valve 27 or an air filter and/or a pressure regulator, both of which are shown at 28, may be disposed between the compressor outlet 47 and the air supply control valve 27. A pressure sensor 48 may be used to sense the pressure in the reductant reservoir 17 and the pressure sensor 48 may be linked to the controller 26. When the pressure in the reductant reservoir 17 is below a desired threshold, the controller 26 may send a signal to the solenoid 29 of the air supply control valve 27 thereby shifting the air supply control valve 27 from the closed position shown at FIG. 2 to an open position (not shown) thereby charging the reductant reservoir 17 with pressure. When the pressure in the reductant reservoir 17 reaches a threshold value, the air supply control valve 27 may shift back to its normally closed position shown in FIG. 2. To safely refill the reductant reservoir 17 with reductant, pressure should be released from the reductant reservoir 17. To accomplish this, a pressure relief valve 51 may be provided that may be manual, as shown, or may be activated by the controller 26.

With sufficient reductant in the reductant reservoir 17, the reductant pump 21 may draw fluid from the reductant reservoir 17, through the filter 22 and through the pump outlet 35. The pump outlet 35 may be in communication with the line 38 as well as the pressure regulator 23. If the pressure in the line 38 and the pilot line 36 is below a certain threshold, the reductant control valve 34 may remain in the closed position as shown in FIG. 2 and fluid may be communicated through the line 38 towards the reductant injector 16. If the reductant pressure in the line 38 and the pilot line 36 rise above the threshold level, the pressure in the pilot line 36 may shift the reductant control valve 34 to an open position, thereby recirculating reductant from the pump outlet 35, through the reductant return line 37 and back to the reductant reservoir 17. If the pressure in the line 38 is sufficient and an injection event is requested, upon the controller 26 receiving a pressure reading from the reductant fluid pressure sensor 42, the controller 26 may send a signal to the solenoid 25 of the injector control valve 24, thereby shifting the injector control valve 24 to an open position (not shown) and causing reductant from the line 38, through the injector control valve 24 and through the orifice 30 and to the line 43 that leads to the aftertreatment system 13.

Returning to the pressure regulator 23, the pump outlet 35 may be in communication with an anti-backflow check valve 52. The check valve 52 may be disposed in the backflow line 39 and opposite the orifice 53 from the pilot line 41. With the reductant control valve 34 in the closed position as shown in FIG. 2, fluid from the pump outlet 35 may flow past the check valve 52 and through the orifice 53 to the backflow line 39, which is in communication with the reductant return line 37. The check valve 52 and the orifice 53 are useful for purging the reductant dosing system 12. The check valve 52 prevents air in the lines 39 or 37 from passing through the check valve back towards the reductant pump 21, which would prevent a complete purge.

INDUSTRIAL APPLICABILITY

To prevent boiling or limit vaporization of reductant fluid (or DEF) at high altitudes and/or high temperatures, a compressed gas source in the form of a compressed gas source 18 and air supply control valve 27 may be connected to the reductant reservoir 17. A pressure regulator 28, with or without filtering capabilities, may be included to control the pressure of the air delivered to the reductant reservoir 17. Increased pressure in the reductant reservoir 17 increases the boiling point of the reductant fluid above expected operating temperatures. A safety relief valve 31 may also be included to relieve pressure in the reductant reservoir 17, for safety purposes, such as when the power system 10 is moving from high to low altitudes. A manual or automatic pressure relief valve 51 may be included so that the reductant reservoir 17 may be safely filled. The pressure regulator 23 insures that fluid flowing towards the reductant injector 16 through the line 38 is at an appropriate pressure for an injection. If the pressure in the line 38 is too high, the reductant control valve 34 is opened and reductant fluid is returned to the reductant reservoir 17. If the pressure in the line 38 is not excessive, the reductant control valve 34 remains closed and reductant fluid is delivered to the injector control valve 24, which may be opened by the controller 26 to create an injection event.

A disclosed method for injecting reductant into an exhaust stream of an engine may include providing a reductant reservoir 17 of reductant fluid. The method may further include pressurizing the reductant reservoir 17 using a compressed gas source 18 that is fluidly connected to the reductant reservoir 17 through an air supply control valve 27. The method may further include ordering a first dosing event, which may be carried out by the controller 26. The method then further includes pumping reductant fluid from the reductant reservoir 17 to a reductant injector 16 with a reductant pump 21. The method may further include regulating a pressure of the reductant fluid pumped from the reductant reservoir 17 to the reductant injector 16 and, if the pressure of the reductant fluid pumped from the reductant reservoir 17 to the reductant injector 16 is below a first predetermined value, the method includes opening the air supply control valve 27. If the pressure of the reductant fluid pumped from the reductant reservoir 17 to the reductant injector 16 is above a second predetermined value, the method may include closing the air supply control valve 27. Finally, the method may include injecting reductant fluid through the reductant injector 16 and into the aftertreatment system 13.

In an embodiment, the method may further include opening the reductant control valve 34 when the pressure of the reductant fluid being delivered to the reductant injector 16 rises above a predetermined value and recirculating reductant fluid from the reductant pump 21 back to the reductant reservoir 17.

The controller 26 may be in communication with the air supply control valve 27, the injector control valve 24, the pressure sensor 48 and the ambient air pressure sensor 33. The pilot actuated reductant control valve 34 may also be replaced by a solenoid valve that is linked to the controller 26. The controller 26 may embody a single or multiple microprocessors, field programmable gate arrays (FPGAs), digital signal processors (DSPs), etc. that include a means for controlling an operation of the reductant dosing system 12 in response to signals received from the sensors 48, 33 and valves 27, 24, as well as other signals from the engine 11, the aftertreatment system 13 and possibly the DPF 19. Numerous commercially available microprocessors can be configured to perform the functions of the controller 26. It should be appreciated that the controller 26 could readily embody a microprocessor separate from that controlling other non-exhaust related functions, or that the controller 26 could be integral with a general power system microprocessor and be capable of controlling numerous power system functions and modes of operation. If separate from the general power system microprocessor, the controller 26 may communicate with the general power system microprocessor via data links or other methods that will be apparent to those skilled in the art. Various other circuits may be associated with the controller 26, including power supply circuitry, signal-conditioning circuitry, actuator driver circuitry (i.e., circuitry powering solenoids, motors or piezo actuators), and communication circuitry.

In at least one configuration, one or more heaters may be associated with the reductant reservoir 17 to avoid freezing of the reductant fluid.

What is claimed is:

1. A reductant dosing system for an engine, comprising:
   a reservoir accommodating reductant fluid;
   the reservoir fluidly connected to an inlet of a reductant pump, the reductant pump having an outlet fluidly connected to the reservoir, an inlet of a pressure regulator and an inlet of an injector;
   the pressure regulator including a reductant pressure control valve that fluidly connects the outlet of the reductant pump to the reservoir when the reductant pressure control valve is in an open position;
   a compressed gas source fluidly connected to an air supply control valve that fluidly connects the compressed gas source to the reservoir when the air supply control valve is in an open position, the air supply control valve also having a closed position, the air supply control valve being linked to a controller for shifting the air supply control valve between the open and closed positions; and
   a pressure sensor fluidly connected to the outlet of the reductant pump and linked to the controller, wherein when a pressure of the outlet of the reductant pump falls below a predetermined value, the controller opens the air supply control valve.

2. The reductant dosing system of claim 1 wherein the reductant pressure control valve is a normally closed directional control valve that shifts to the open position when an outlet pressure of the reductant pump exceeds a predetermined value.

3. The reductant dosing system of claim 1 wherein the reductant pressure control valve includes an outlet fluidly connected to the reservoir, the outlet of the reductant pump also being connected to the outlet of the reductant pressure control valve with a check valve disposed therebetween and preventing flow from the outlet of the reductant pressure control valve to the outlet of the reductant pump but permitting flow from the outlet of the reductant pump to the outlet of the reductant pressure control valve.

4. The reductant dosing system of claim 1 wherein the controller is linked to an ambient air pressure sensor and, when an ambient air pressure drops below a predetermined value, the controller shifting the air supply control valve to the open position.

5. The reductant dosing system of claim 1 wherein the compressed gas source and the reductant pump are both driven by the engine.

6. The reductant dosing system of claim 1 further including a pressure sensor fluidly connected to the outlet of the reductant pump and linked to the controller, wherein when a pressure of the outlet of the reductant pump rises above a predetermined value, the controller closes the air supply control valve.

7. The reductant dosing system of claim 1 further including an output orifice fluidly connected between the injector and an exhaust stream.

8. The reductant dosing system of claim 1 further including an air pressure release valve fluidly connected to and disposed between the air supply control valve and the reservoir.

9. The reductant dosing system claim 1 wherein the reductant pressure control valve includes an inlet that is fluidly connected to the outlet of the reductant pump and an outlet that is fluidly connected to a reductant return line that fluidly connects the reductant pressure control valve to the reservoir when the reductant pressure control valve is in the open position.

10. The reductant dosing system of claim 1 wherein the reservoir is fluidly connected to a reservoir pressure release valve.

11. The reductant dosing system of claim 1 wherein the injector is a normally closed directional control valve having open and closed positions and includes a solenoid that is linked to the controller for shifting the normally closed directional control valve between the open and closed positions.

12. A power source, comprising:
   an engine connected to an exhaust, the exhaust passing through a selective catalytic reduction (SCR) module, the exhaust fluidly connected to a reductant dosing system upstream of the SCR module;
   the reductant dosing system including
      a reservoir accommodating reductant fluid, a compressed gas source and a reductant pump;
      the reservoir fluidly connected to an inlet of the reductant pump, the reductant pump having an outlet fluidly connected to the reservoir, an inlet of a pressure regulator and an inlet of an injector;
      the pressure regulator including a reductant pressure control valve that fluidly connects the outlet of the reductant pump to the reservoir when the reductant pressure control valve is in an open position;
      a compressed gas source fluidly connected to an air supply control valve that fluidly connects the compressed gas source to the reservoir when the air supply control valve is in an open position, the air supply control valve also having a closed position, the air supply control valve being linked to a controller for shifting the air supply control valve between the open and closed positions; and
      a pressure sensor fluidly connected to the outlet of the reductant pump and linked to the controller, wherein when a pressure of the outlet of the reductant pump falls below a predetermined value, the controller opens the air supply control valve.

13. The reductant dosing system of claim 12 wherein the reductant pressure control valve is a normally closed directional control valve that shifts to the open position when an outlet pressure of the reductant pump exceeds a predetermined value.

14. The reductant dosing system of claim 12 wherein the reductant pressure control valve includes an outlet fluidly connected to the reservoir, the outlet of the reductant pump also being connected to the outlet of the reductant pressure control valve with a check valve disposed therebetween and preventing flow from the outlet of the reductant pressure control valve to the outlet of the reductant pump but permitting flow from the outlet of the reductant pump to the outlet of the reductant pressure control valve.

15. The reductant dosing system of claim 12 wherein the controller is linked to an ambient air pressure sensor and, when an ambient air pressure drops below a predetermined value, the controller shifts the air supply control valve to the open position.

16. A method for injecting reductant into an exhaust stream of an engine, comprising:
providing a reservoir of reductant;
pressurizing the reservoir with a compressed gas source that is fluidly connected to the reservoir through an air supply control valve;
ordering a first dosing event;
pumping reductant from the reservoir to an injector with a reductant pump;
regulating a pressure of the reductant pumped from the reservoir to the injector and,
when the pressure of the reductant pumped from the reservoir to the injector is below a first predetermined value, opening the air supply control valve;
when the pressure of the reductant pumped from the reservoir to the injector is above a second predetermined value, closing the air supply control valve; and
injecting reductant fluid through the injector and into a selective catalytic reduction module.

17. The method of claim 16 further comprising recirculating at least some of the reductant fluid pumped by the reductant pump back to the reservoir when the pressure of the reductant pumped from the reservoir to the injector is above the second predetermined value.

18. The method of claim 16 wherein the injector is a normally closed directional control valve having a solenoid linked to a controller and wherein the ordering of the first dosing event further includes transmitting a signal from the controller to the solenoid to open the injector.

19. The method of claim 16 wherein the compressed gas source and reductant pump or both driven by the engine.

* * * * *